(12) United States Patent
Abe et al.

(10) Patent No.: US 9,097,882 B2
(45) Date of Patent: Aug. 4, 2015

(54) ZOOM LENS SYSTEM

(75) Inventors: Tetsuya Abe, Hokkaido (JP); Masaru Eguchi, Saitama (JP)

(73) Assignee: HOYA CORPORATION, Tokyo (JP)

( * ) Notice: Subject to any disclaimer, the term of this patent is extended or adjusted under 35 U.S.C. 154(b) by 772 days.

(21) Appl. No.: 13/306,070

(22) Filed: Nov. 29, 2011

(65) Prior Publication Data

US 2012/0140327 A1 Jun. 7, 2012

(30) Foreign Application Priority Data

Dec. 3, 2010 (JP) .................................. 2010-270024

(51) Int. Cl.
*G02B 15/177* (2006.01)

(52) U.S. Cl.
CPC .................................... *G02B 15/177* (2013.01)

(58) Field of Classification Search
CPC .......... G02B 9/34; G02B 9/58; G02B 15/177; G02B 27/64–27/646
USPC ......... 359/554, 557, 362, 379–380, 382–383, 359/421–422, 432, 642, 671–706, 781–783, 359/761, 770, 791
See application file for complete search history.

(56) References Cited

U.S. PATENT DOCUMENTS

| | | | | |
|---|---|---|---|---|
| 5,886,835 A * | 3/1999 | Suzuki et al. | ................ | 359/782 |
| 6,124,984 A * | 9/2000 | Shibayama et al. | .......... | 359/689 |
| 6,327,099 B1 * | 12/2001 | Itoh | ................ | 359/686 |
| 6,671,103 B2 * | 12/2003 | Itoh | ................ | 359/689 |
| 7,907,351 B2 * | 3/2011 | Tomioka | ....................... | 359/691 |
| 2002/0154908 A1 * | 10/2002 | Itoh | ................ | 396/72 |
| 2003/0012567 A1 * | 1/2003 | Itoh | ................ | 396/72 |
| 2005/0270400 A1 * | 12/2005 | Ito | ................ | 348/335 |
| 2006/0114574 A1 * | 6/2006 | Sekita | .......... | 359/689 |

(Continued)

FOREIGN PATENT DOCUMENTS

| | | |
|---|---|---|
| JP | 2003-107351 | 4/2003 |
| JP | 2003-215451 | 7/2003 |

(Continued)

OTHER PUBLICATIONS

"Paraxial Ray Trace for a Lens System," provided by LightMachinery, http://lightmachinery.com/paraxial-ray-trace.php. Calculations made on Jun. 24, 2014.*

(Continued)

*Primary Examiner* — Stephone B Allen
*Assistant Examiner* — Jeffrey Madonna
(74) *Attorney, Agent, or Firm* — Greenblum & Bernstein, P.L.C.

(57) ABSTRACT

A zoom lens system includes a negative first lens group, a positive second lens group, and a positive third lens group, in that order from the object side, wherein upon zooming from the short focal length extremity to the long focal length extremity, the distance between the first lens group and the second lens group decreases, and the distance between the second lens group and the third lens group increases. The second lens group includes a positive first sub-lens group and a negative second sub-lens group, in that order from the object side. The second sub-lens group is a focusing lens group which is moved along the optical axis direction during a focusing operation. The following condition (1) is satisfied:

$$-1.5 < F2/F2B < -0.7 \qquad (1),$$

wherein F2 designates the focal length of the second lens group, and F2B designates the focal length of the second sub-lens group.

9 Claims, 17 Drawing Sheets

(56) References Cited

U.S. PATENT DOCUMENTS

| | | | |
|---|---|---|---|
| 2006/0238890 A1* | 10/2006 | Nanba et al. | 359/689 |
| 2008/0062532 A1* | 3/2008 | Iwama | 359/689 |
| 2009/0091843 A1* | 4/2009 | Ohata | 359/689 |
| 2011/0026131 A1* | 2/2011 | Ito | 359/682 |
| 2011/0096407 A1* | 4/2011 | Ohata et al. | 359/686 |
| 2012/0229912 A1* | 9/2012 | Abe et al. | 359/680 |
| 2012/0243107 A1* | 9/2012 | Abe et al. | 359/680 |

FOREIGN PATENT DOCUMENTS

| | | |
|---|---|---|
| JP | 2004-109153 | 4/2004 |
| JP | 4067828 | 1/2008 |

OTHER PUBLICATIONS

Japan Office action, dated Feb. 25, 2014 along with an English translation thereof.

* cited by examiner

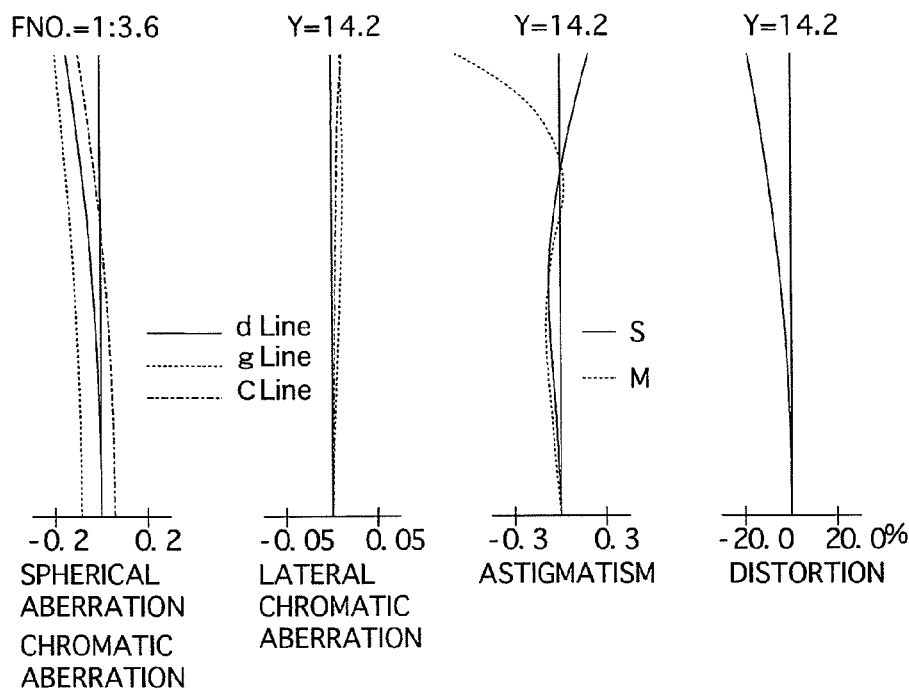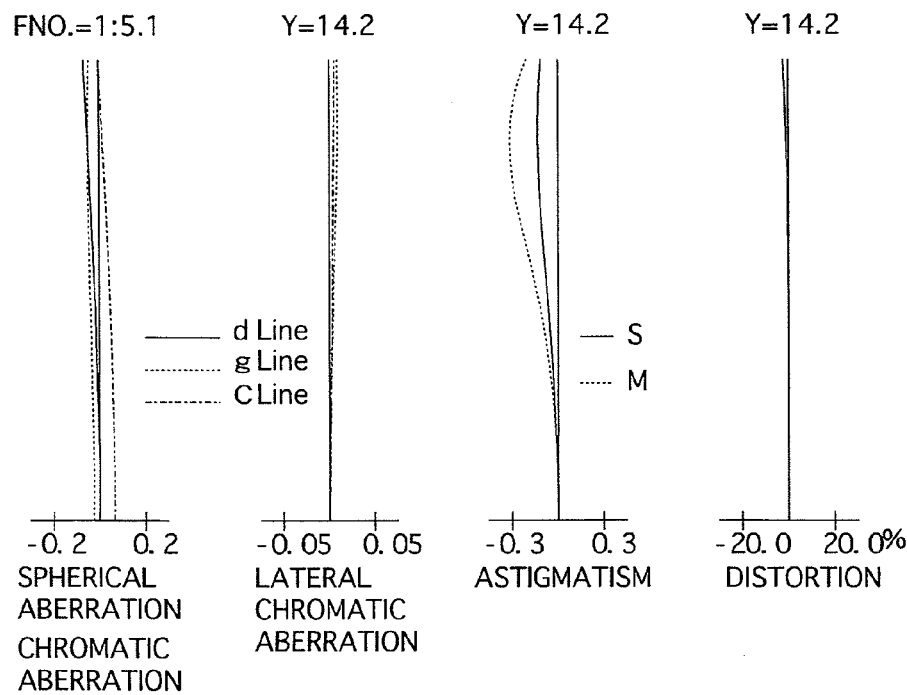

Fig. 4A  Fig. 4B  Fig. 4C  Fig. 4D
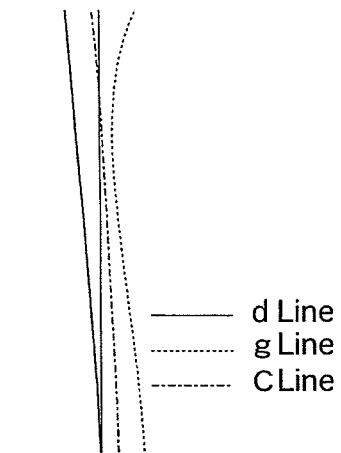
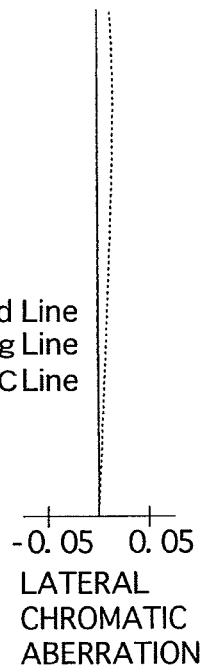
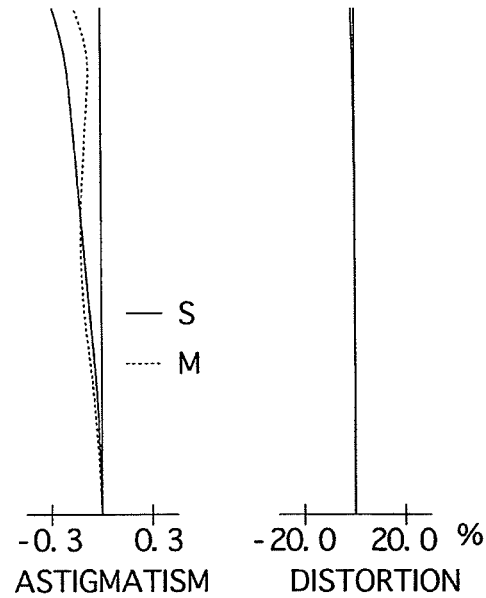

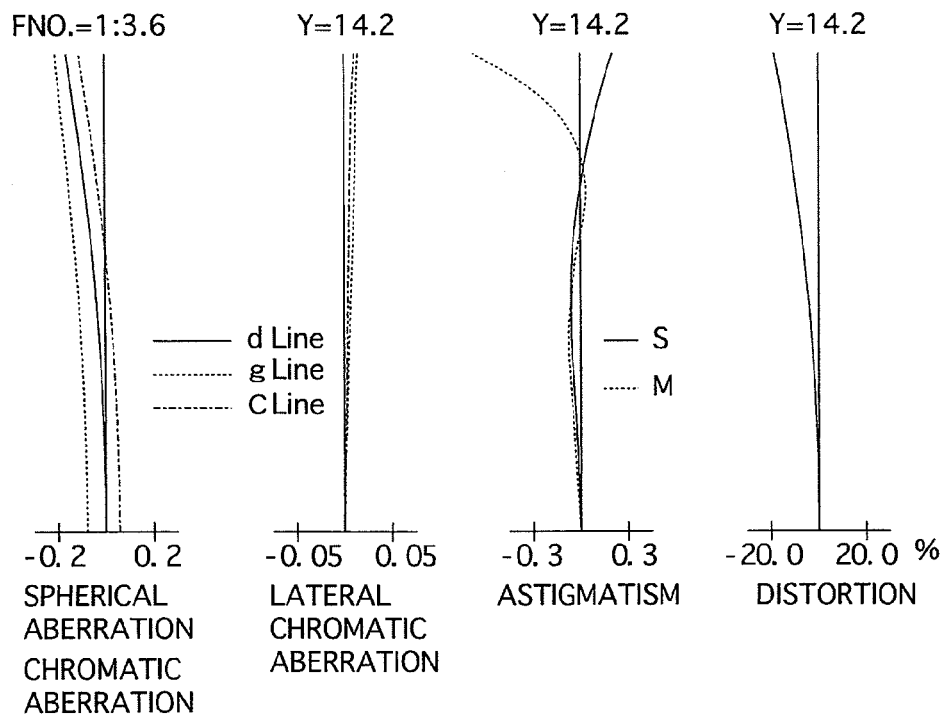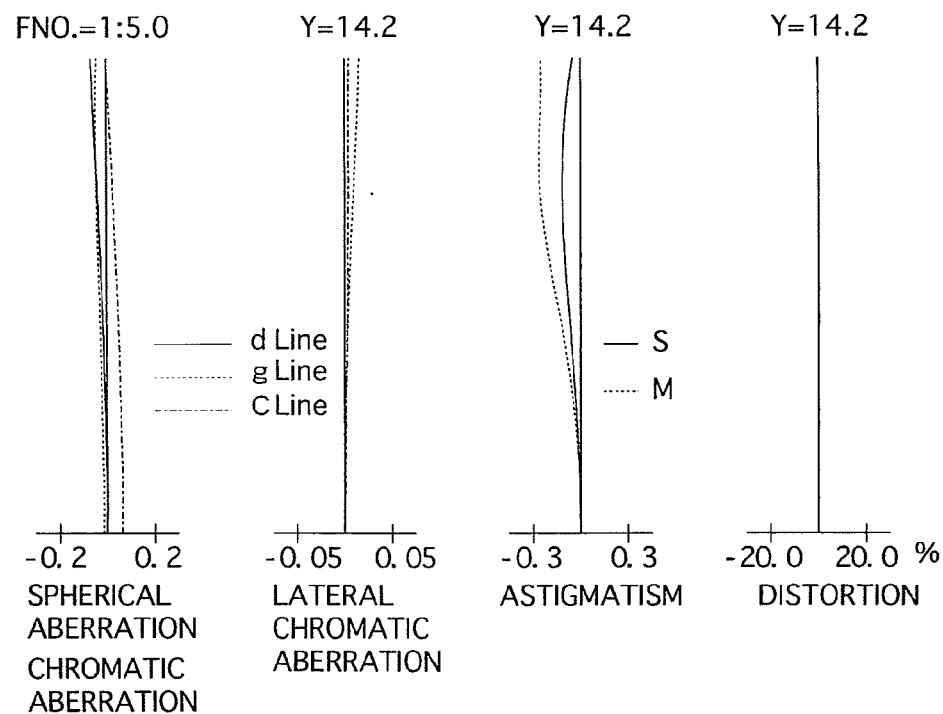

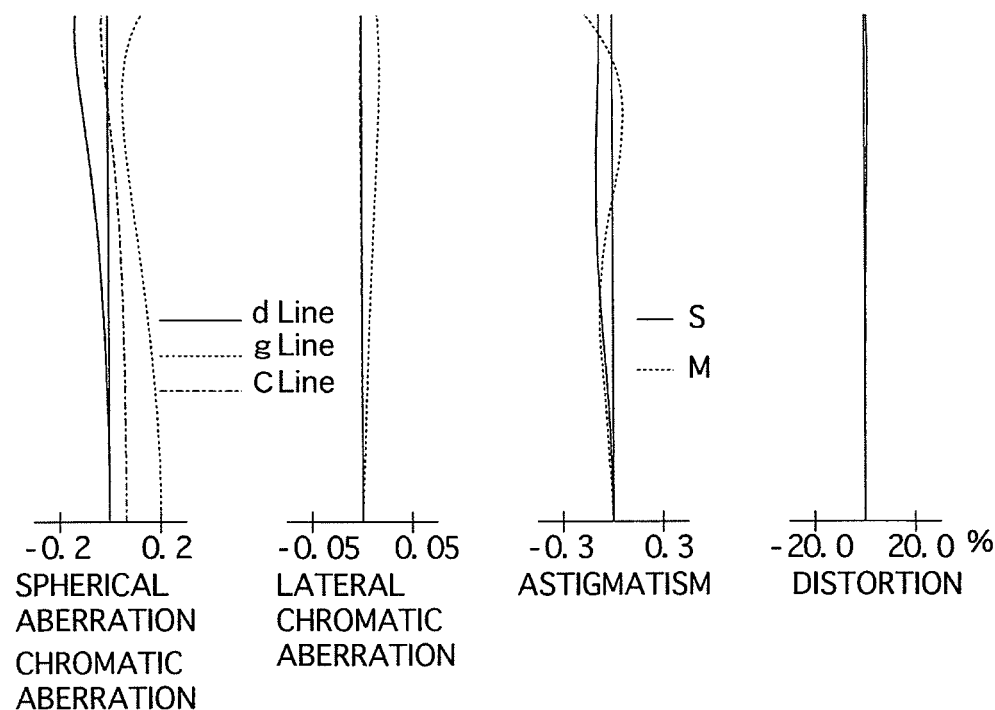

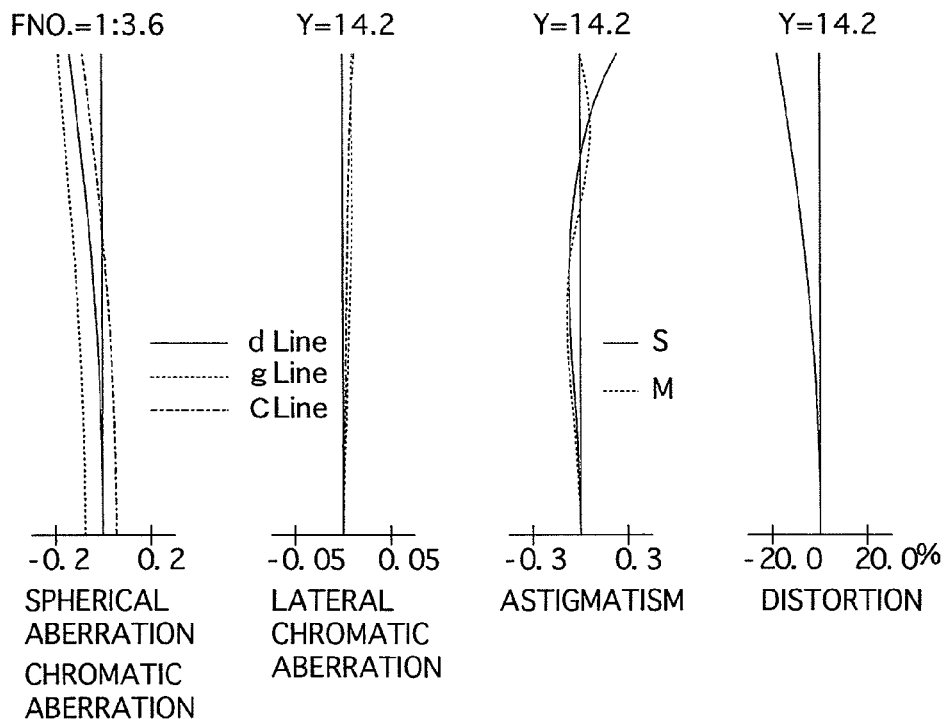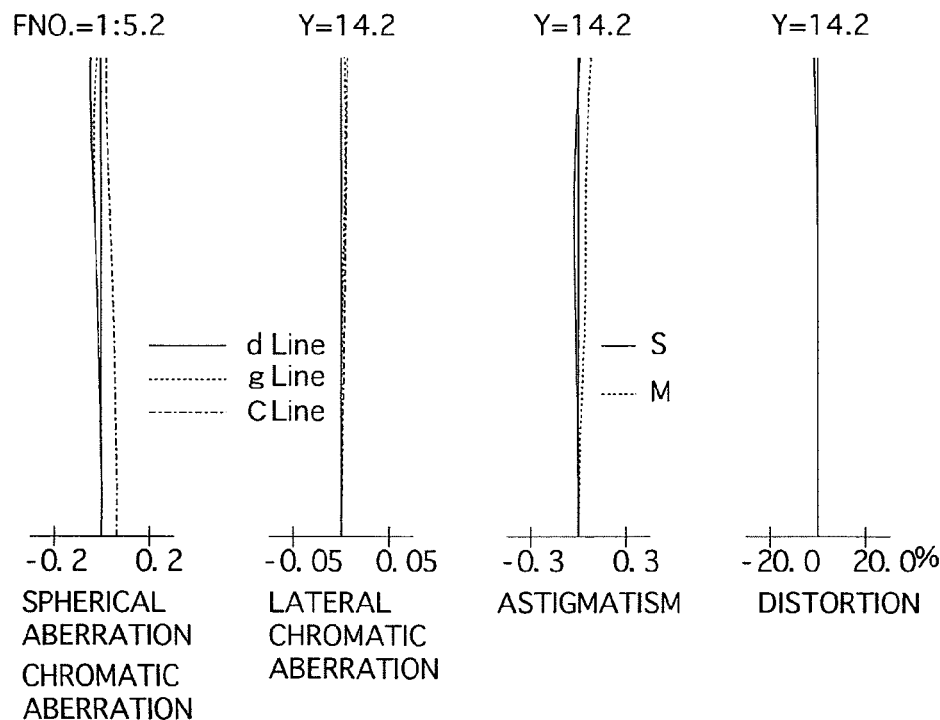

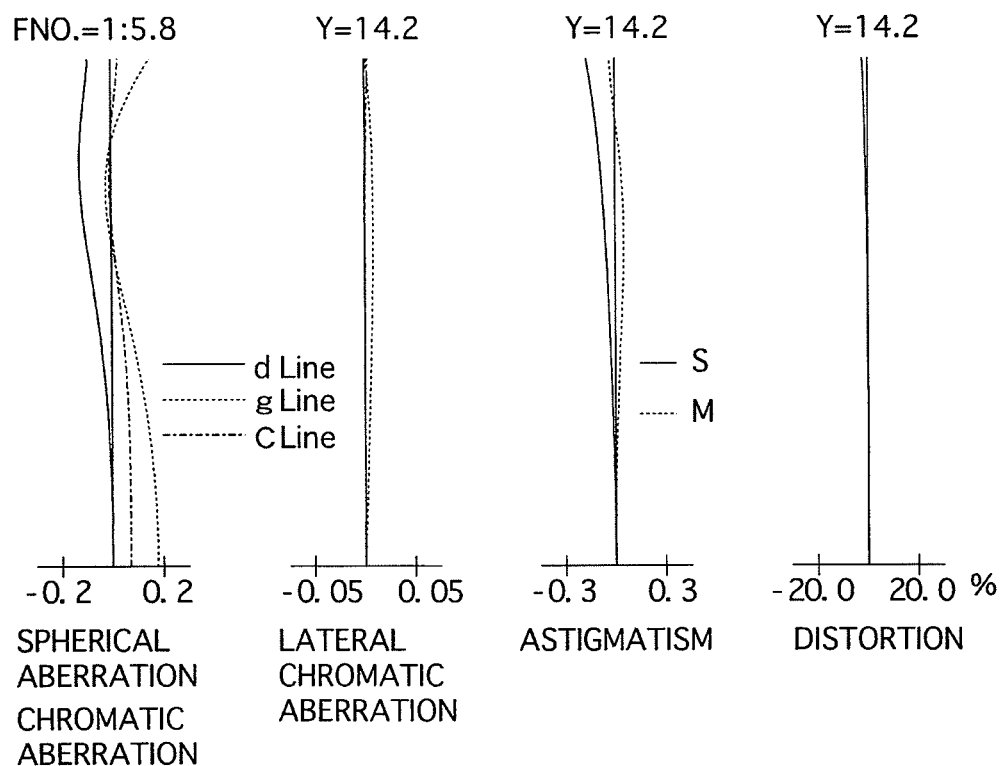

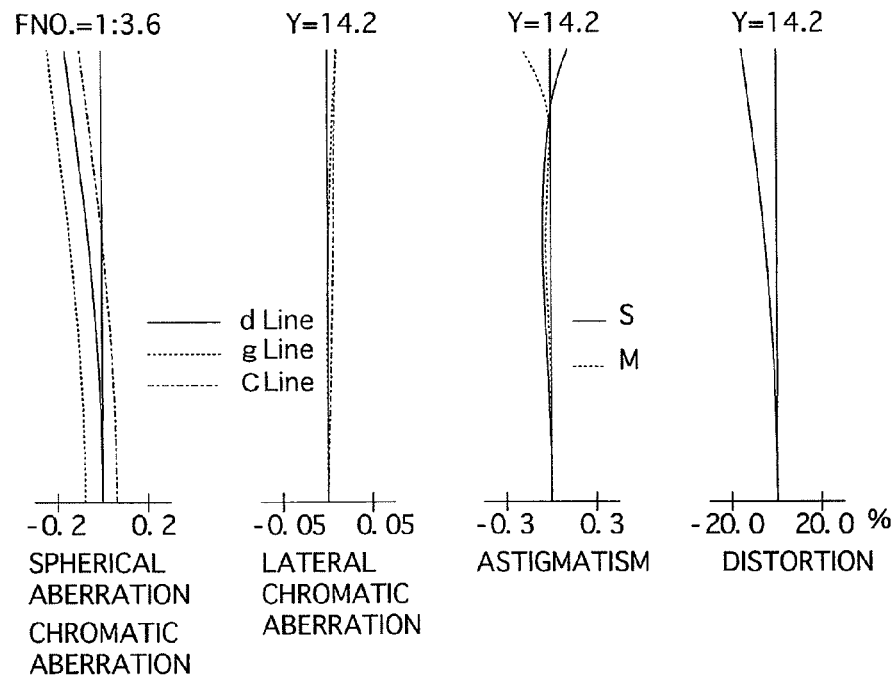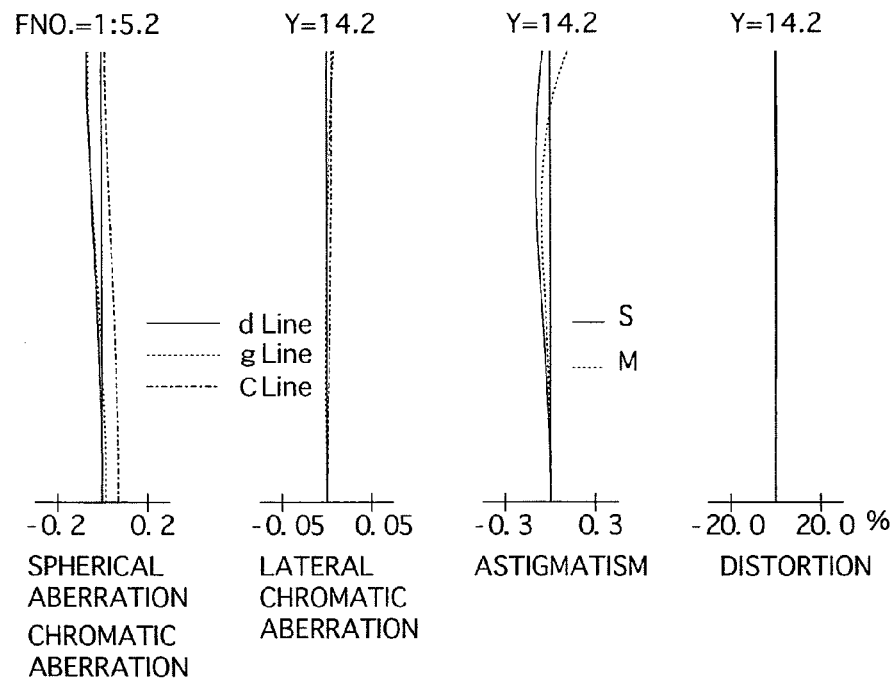

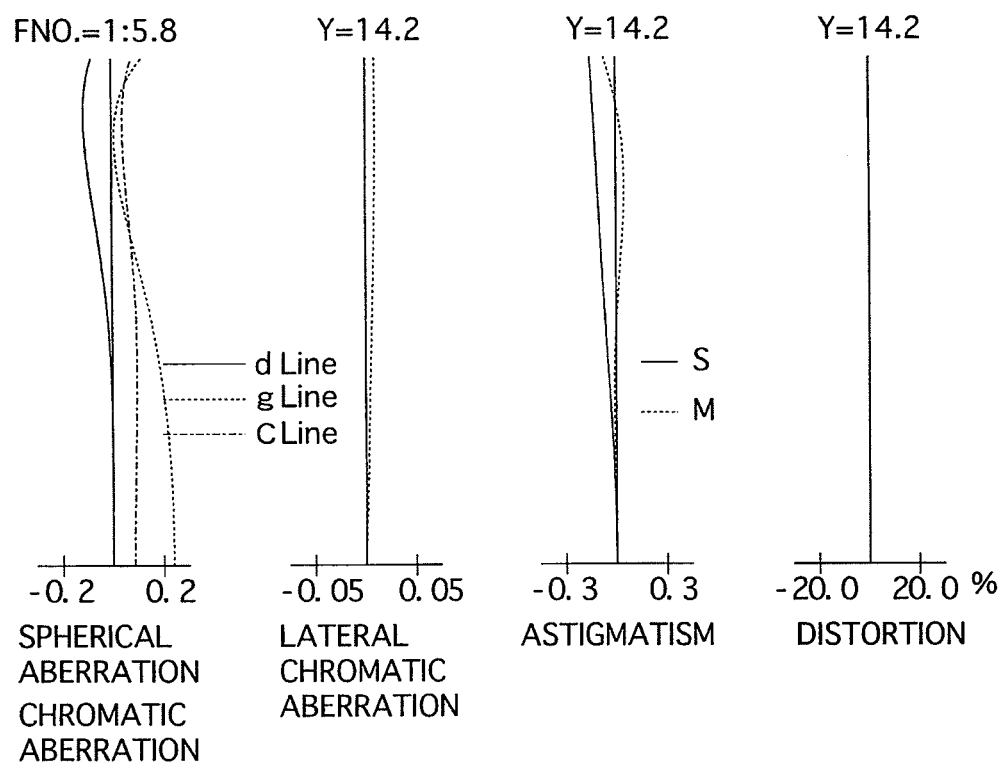

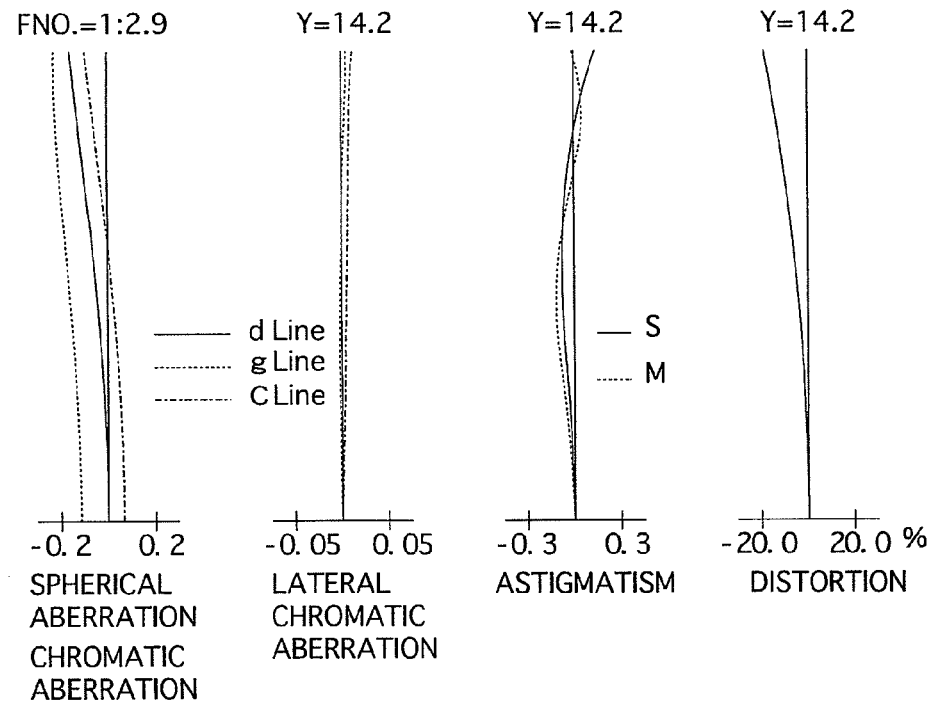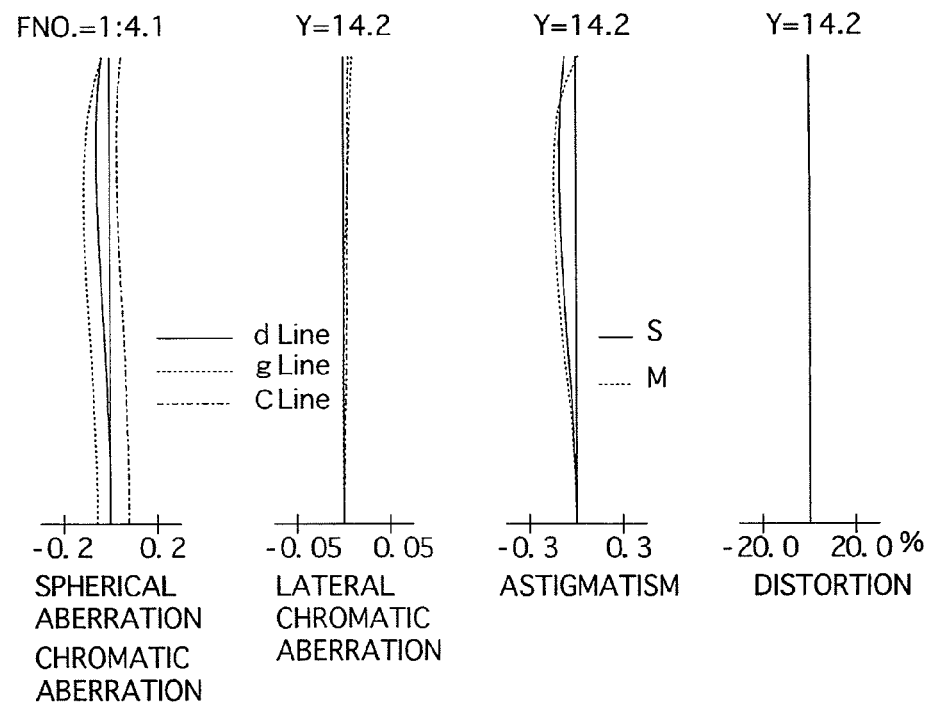

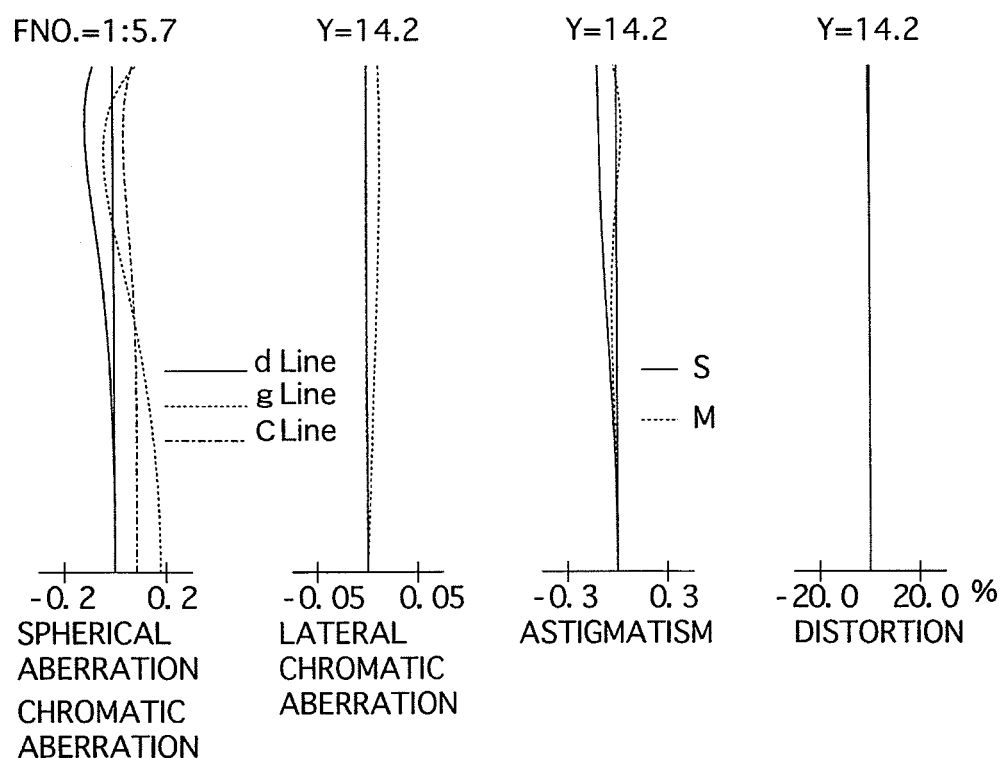

ZOOM LENS SYSTEM

BACKGROUND OF THE INVENTION

1. Field of the Invention

The present invention relates to a zoom lens system which includes a wide-angle range.

2. Description of Related Art

An image sensor used in a compact digital camera typically has a size of about ½.5-inch through ⅟1.7-inch, in which high pixelization is achieved by miniaturizing the pixel pitch. However, in recent years, the pixel pitch has been reduced down to approximately 1 through 2 µm, and further improvement of the image quality cannot be expected. One way to achieve high pixelization is to use a large-sized image sensor in which the pixel pitch can be enlarged even in a compact digital camera. However, if the image sensor is enlarged, the optical system also increases in size to the extent that such an optical system cannot be accommodated in a compact digital camera. In particular, in a focusing method of the related art in which an entire lens group (so as to constitute a focusing lens group) such as a frontmost lens group or rearmost lens group is moved along the optical axis direction, it is difficult to miniaturize a lens unit which includes a focusing mechanism for such a focusing lens group.

A zoom lens system having three lens groups, i.e., a negative lens group, a positive lens group and a negative lens group, in that order from the object side, and a zoom lens system that has favorable telecentricity having a negative lens group, a positive lens group and a positive lens group, in that order from the object side, are known in the art as examples of lens systems which are aimed at achieving a wide angle-of-view and a reduced length in the optical axis direction. However, in the former zoom lens system, focusing is often carried out by the first lens group, and in the latter zoom lens system, focusing is often carried out by the third lens group, in which both of these first and third lens groups have large diameters; furthermore, since the amount of movement required for either of these lens groups is also comparatively large, there is a problem with there being a large mechanical burden.

In an effort to solve this problem, a zoom lens system having three lens groups, i.e., a negative lens group, a positive lens group and a positive lens group, in that order from the object side, is disclosed in Japanese Patent No. 4,067,828, which attempts to achieve miniaturization and a reduction in weight of the zoom lens system by using the lens element provided closest to the image side within the second lens group as a focusing lens group.

However, in the zoom lens system disclosed in the above-mentioned Japanese Patent No. 4,067,828, since the refractive power of the focusing lens group is weak, the amount of movement (along the optical axis) of this focusing lens group during a focusing operation is large, so that the reduction of mechanical burden of the focusing mechanism, and the miniaturization of the zoom lens system are insufficient.

SUMMARY OF THE INVENTION

The present invention has been devised in view of the above-described problems, and provides a zoom lens system having a superior optical quality which achieves miniaturization and a reduction in weight of the entire zoom lens system by reducing the amount of movement of the focusing lens group during a focusing operation; furthermore, the zoom lens system includes a wide-angle range, has a high zoom ratio and is compatible with a large image sensor.

According to an aspect of the present invention, a zoom lens system is provided, including a negative first lens group, a positive second lens group, and a positive third lens group, in that order from the object side, wherein upon zooming from the short focal length extremity to the long focal length extremity, the distance between the first lens group and the second lens group decreases, and the distance between the second lens group and the third lens group increases. The second lens group includes a positive first sub-lens group and a negative second sub-lens group, in that order from the object side. The second sub-lens group is a focusing lens group which is moved along the optical axis direction during a focusing operation. The following condition (1) is satisfied:

$$-1.5 < F2/F2B < -0.7 \qquad (1),$$

wherein F2 designates the focal length of the second lens group, and F2B designates the focal length of the second sub-lens group.

The second sub-lens group can be a single negative lens element.

It is desirable for the following condition (2) to be satisfied:

$$0 < (RA+RB)/(RA-RB) < 3 \qquad (2),$$

wherein RA designates the radius of curvature of the surface on the object side of the single negative lens element of the second sub-lens group, and RB designates the radius of curvature of the surface on the image side of the single negative lens element of the second sub-lens group.

It is desirable for the following condition (3) to be satisfied:

$$\nu 2B > 45 \qquad (3),$$

wherein ν2B designates the Abbe number with respect to the d-line of the single negative lens element of the second sub-lens group.

It is desirable for the following condition (4) to be satisfied:

$$T2B/T2 < 0.1 \qquad (4),$$

wherein T2B designates the distance along the optical axis from the surface of the second sub-lens group that is closest to the object side to the surface of the second sub-lens group that is closest to the image side (i.e., the thickness of the second sub-lens group in mm), and T2 designates the distance along the optical axis from the surface of the second lens group that is closest to the object side to the surface of the second lens group that is closest to the image side (i.e., the thickness of the second lens group in mm).

It is desirable for the following condition (5) to be satisfied:

$$1.05 < M3T/M3W < 1.35 \qquad (5),$$

wherein M3T designates the lateral magnification of the third lens group when focusing on an object at infinity at the long focal length extremity, and M3W designates the lateral magnification of the third lens group when focusing on an object at infinity at the short focal length extremity.

It is desirable for the first sub-lens group of the second lens group to include a positive lens element, a positive lens element, a negative lens element, and a positive lens element, in that order from the object side.

It is desirable for a fourth lens group to be provided in between the third lens group and the imaging plane, wherein the fourth lens group includes a single negative lens element and remains stationary with respect to the optical axis direction (the distance between the fourth lens group and the imaging plane I remains constant).

It is desirable for the second sub-lens group of the second lens group to include an image-stabilizing lens group which is moved in a direction orthogonal to the optical axis to change the imaging position in order to correct image shake.

It is desirable for the first lens group to include a negative lens element, a lens element having an aspherical surface on at least one side thereof, and a positive lens element, in that order from the object side.

According to the present invention, a zoom lens system is provided, having a superior optical quality which achieves miniaturization and a reduction in weight of the entire zoom lens system by reducing the amount of movement of the focusing lens group during a focusing operation; furthermore, the zoom lens system includes a wide-angle range, has a high zoom ratio and is compatible with a large image sensor.

The present disclosure relates to subject matter contained in Japanese Patent Application No. 2010-270024 (filed on Dec. 3, 2010) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement of FIG. 1, at the short focal length extremity;

FIGS. 3A, 3B, 3C and 3D show various aberrations that occurred in the lens arrangement of FIG. 1, at an intermediate focal length;

FIGS. 4A, 4B, 4C and 4D show various aberrations that occurred in the lens arrangement of FIG. 1, at the long focal length extremity;

FIGS. 6A, 6B, 6C and 6D show various aberrations that occurred in the lens arrangement of FIG. 5, at the short focal length extremity;

FIGS. 7A, 7B, 7C and 7D show various aberrations that occurred in the lens arrangement of FIG. 5, at an intermediate focal length;

FIGS. 8A, 8B, 8C and 8D show various aberrations that occurred in the lens arrangement of FIG. 5, at the long focal length extremity;

FIGS. 10A, 10B, 10C and 10D show various aberrations that occurred in the lens arrangement of FIG. 9, at the short focal length extremity;

FIGS. 11A, 11B, 11C and 11D show various aberrations that occurred in the lens arrangement of FIG. 9, at an intermediate focal length;

FIGS. 12A, 12B, 12C and 12D show various aberrations that occurred in the lens arrangement of FIG. 9, at the long focal length extremity;

FIGS. 14A, 14B, 14C and 14D show various aberrations that occurred in the lens arrangement of FIG. 13, at the short focal length extremity;

FIGS. 15A, 15B, 15C and 15D show various aberrations that occurred in the lens arrangement of FIG. 13, at an intermediate focal length;

FIGS. 16A, 16B, 16C and 16D show various aberrations that occurred in the lens arrangement of FIG. 13, at the long focal length extremity;

FIGS. 18A, 18B, 18C and 18D show various aberrations that occurred in the lens arrangement of FIG. 17 at the short focal length extremity;

FIGS. 19A, 19B, 19C and 19D show various aberrations that occurred in the lens arrangement of FIG. 17, at an intermediate focal length;

FIGS. 20A, 20B, 20C and 20D show various aberrations that occurred in the lens arrangement of FIG. 17, at the long focal length extremity;

DESCRIPTION OF THE EMBODIMENTS

Figure 21:
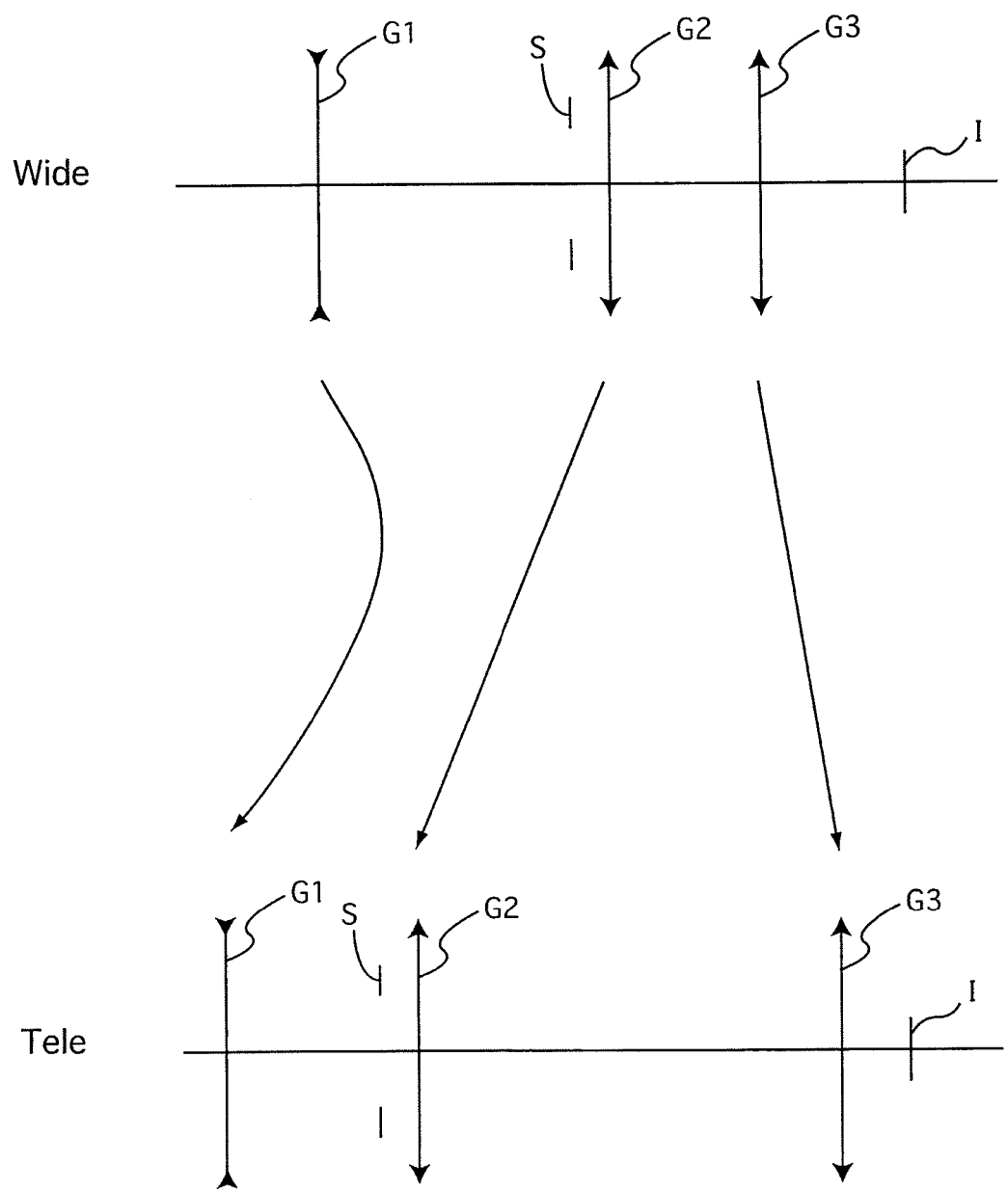
FIG. 21 shows a first zoom path of the zoom lens system according to the present invention.

The zoom lens system in the first and third through fifth numerical embodiments of the present invention, as shown in the zoom path of FIG. 21, is configured of a negative first lens group G1, a positive second lens group G2, and a positive third lens group G3, in that order from the object side. A diaphragm S which is disposed in between the first lens group G1 and the second lens group G2 moves integrally with the second lens group G2 during zooming. 'I' designates the imaging plane.

Upon zooming from the short focal length extremity (WIDE) to the long focal length extremity (TELE), each of the first through third lens groups G1 through G3 are moved along the optical axis direction so that the distance between the first lens group G1 and the second lens group G2 decreases, and the distance between the second lens group G2 and the third lens group G3 increases.

More specifically, upon zooming from the short focal length extremity to the long focal length extremity, the first lens group G1 first moves toward the image side and thereafter moves toward the object side, the second lens group G2 moves monotonically toward the object side, and the third lens group G3 moves monotonically toward the image side.

Figure 22:
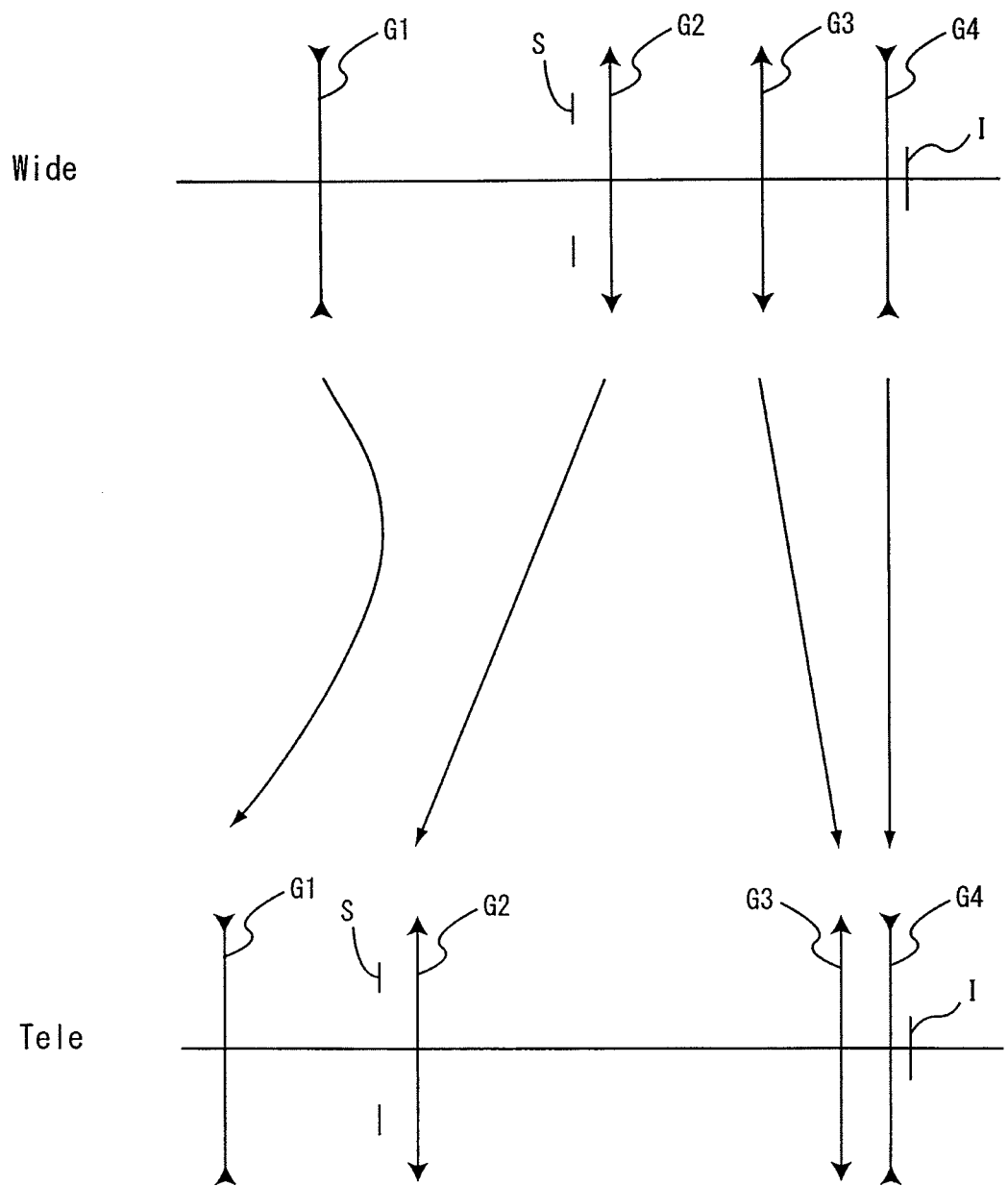
FIG. 22 shows a second zoom path of the zoom lens system according to the present invention.

The zoom lens system in the second numerical embodiment of the present invention, as shown in the zoom path of FIG. 22, is configured of a negative lens group G1, a positive second lens group G2, a positive third lens group G3 and a negative fourth lens group G4, in that order from the object side. A diaphragm S which is disposed in between the first lens group G1 and the second lens group G2 moves integrally with the second lens group G2 during zooming. 'I' designates the imaging plane.

Upon zooming from the short focal length extremity (WIDE) to the long focal length extremity (TELE), each of the first through third lens groups G1 through G3 are moved along the optical axis direction so that the distance between the first lens group G1 and the second lens group G2 decreases, the distance between the second lens group G2 and the third lens group G3 increases, and the distance between the third lens group G3 and the fourth lens group G4 decreases.

More specifically, upon zooming from the short focal length extremity to the long focal length extremity, the first lens group G1 first moves toward the image side and thereafter moves toward the object side, the second lens group G2 moves monotonically toward the object side, the third lens group G3 moves monotonically toward the image side, and the fourth lens group G4 does not move in the optical axis direction (remains stationary with respect to the distance from the imaging plane I).

In each of the first through fifth numerical embodiments, the first lens group G1 is configured of a negative lens element 11, a negative lens element 12, and a positive lens element 13, in that order from the object side. The negative lens element 12 is provided with an aspherical surface on each side. Note that the lens element 12 has a relatively low refractive power that can either be negative or positive.

In each of the first through fifth numerical embodiments, the second lens group G2 is configured of a positive first sub-lens group G2A and a negative second sub-lens group G2B, in that order from the object side.

The first sub-lens group G2A is configured of a positive lens element 21, a cemented lens having a positive lens element 22 and a negative lens element 23; and a positive lens element 24, in that order from the object side. The positive lens element 21 has an aspherical surface on each side thereof.

The second sub-lens group G2B is configured of a single negative lens element 25. The second sub-lens group G2B (single negative lens element 25) constitutes a focusing lens group which is moved in the optical axis direction during a focusing operation (the second sub-lens group G2B (single negative lens element 25) is moved toward the image side in order to perform focusing on an object at infinity to an object at a finite distance).

The third lens group G3 is configured of a single positive lens element 31. The positive lens element 31 has an aspherical surface on each side thereof.

According to the zoom lens system of the present invention, the second lens group G2, which is moved during zooming, is divided into two lens groups, namely, the first sub-lens group G2A and the second sub-lens group G2B, and the second sub-lens group G2B constitutes as a focusing group that is moved along the optical axis direction during a focusing operation. According to this configuration, the weight of the focusing lens group can be reduced.

Furthermore, in the present invention, by specifying the refractive power of the second sub-lens group G2B, which is the focusing group that is divided from the second lens group G2, to within the predetermined optimum range that satisfies condition (1), the amount of movement of the second sub-lens group G2B along the optical axis during a focusing operation is reduced. Accordingly, a lens unit which includes the zoom lens system and a focusing mechanism for the focusing lens group can be miniaturized and reduced in weight, and furthermore, the mechanical load on the focusing mechanism can be reduced.

Specifically, condition (1) specifies the ratio of the focal length of the second lens group G2 to the focal length of the second sub-lens group G2B. By satisfying condition (1), an appropriate refractive power for the second sub-lens group (focusing lens group) G2B can be attained, the fluctuation of aberrations during focusing can be suppressed, and the mechanical load on the focusing mechanism can be reduced.

If the upper limit of condition (1) is exceeded, the refractive power of the second sub-lens group (focusing lens group) G2B becomes too weak, so that the amount of movement of the second sub-lens group G2B during a focusing operation increases, so that the optical system (zoom lens system) which includes the focusing mechanism increases in size.

If the lower limit of condition (1) is exceeded, the refractive power of the second sub-lens group (focusing lens group) G2B becomes too strong, so that although the amount of movement of the second sub-lens group G2B during a focusing operation can be reduced, the fluctuation in optical quality upon focusing on an object at infinity to an object at a finite distance becomes large.

As mentioned above, in each of the first through fifth numerical embodiments, the second sub-lens group G2B is configured of a single negative lens element 25. According to this configuration, it is possible to achieve further miniaturization and reduction of weight of the second sub-lens group G2B, which constitutes a focusing lens group.

Condition (2) specifies the shape factor (the ratio of the radius of curvature of the surface on the object side to the radius of curvature of the surface on the image side) of the single negative lens element 25 in the case where the second sub-lens group G2B is configured of the single negative lens element 25. By satisfying condition (2), fluctuation of the optical quality when focusing at a close distance can be reduced.

If the upper limit of condition (2) is exceeded, the curvatures of the surface on the object side and the surface on the image side of the single negative lens element 25 become close (similar) to each other, so that the refractive power of the single negative lens element 25 becomes weak, which results in a large amount of movement of the single negative lens element 25 during a focusing operation.

If the lower limit of condition (2) is exceeded, the curvature of the surface on the object side of the single negative lens element 25, which constitutes the focusing lens group, becomes too great (i.e., the radius of curvature becomes too small), so that a large amount of aberration fluctuations occur during focusing at various object distances.

Condition (3) specifies the Abbe number with respect to the d-line of the single negative lens element 25 in the case where the second sub-lens group G2B is configured of the single negative lens element 25. By satisfying condition (3), aberration fluctuations upon focusing on an object at infinity through to an object at a finite distance can be suppressed.

If the lower limit of condition (3) is exceeded, lateral chromatic aberration fluctuations during focusing increase.

Condition (4) specifies the ratio of the distance along the optical axis between the surface of the second sub-lens group G2B that is closest to the object side and the surface of the second sub-lens group G2B that is closest to the image side (i.e., the thickness of the second sub-lens group G2B along the optical axis direction) to the distance along the optical axis between the surface of the second lens group G2 that is closest to the object side and the surface of the second lens group G2 that is closest to the image side (i.e., the thickness of the second lens group G2 along the optical axis direction). By satisfying condition (4), the weight of the second sub-lens group G2, which constitutes the focusing lens group, can be reduced.

If the upper limit of condition (4) is exceeded, the weight-reduction of the second sub-lens group G2B, which constitutes the focusing lens group, becomes insufficient, and increasing the burden on the focusing mechanism.

Condition (5) specifies the change in the lateral magnification of the third lens group G3 upon zooming from the short focal length extremity to the long focal length extremity. By satisfying condition (5), miniaturization of the zoom lens system and a high zoom ratio can both be achieved.

If the upper limit of condition (5) is exceeded, although advantageous in regard to achieving a high zoom ratio, the change in the lens exit angle (from the third lens group G3) during zooming increases.

If the lower limit of condition (5) is exceeded, since the zooming function of the third lens group G3 decreases, the zooming burden on the second lens group G2 increases, so that the zoom lens system cannot be sufficiently miniaturized.

As described above, as shown in each of the first through fifth numerical embodiments, in the zoom lens system of the present invention, the first sub-lens group G2A is configured of four lens elements, i.e., a positive lens element 21, a positive lens element 22, a negative lens element 23 and a positive lens element 24, in that order from the object side. Accordingly, in a negative-lead lens system like that of the present invention, abaxial coma flare can be reduced over the entire zooming range.

As described above, in the second numerical embodiment of the zoom lens system according to the present invention, a fourth lens group G4 configured of a single lens element 41 which is stationary with respect to the optical axis direction is disposed in between the third lens group G3 and the imaging plane I. According to this arrangement, lateral chromatic aberration and field curvature that occur at the third lens group G3 can be reduced.

In the zoom lens system of the present invention, an arrangement can be employed in which the second sub-lens group G2B is moved in a direction orthogonal to the optical axis to change the imaging position (perform an image-stabilizing operation) in order to correct image shake. According to this configuration, since the image-shake correction lens group (image-stabilizing lens group) can be reduced in weight and in thickness so that the image-stabilizing drive mechanism can be reduced in size compared to the case where the entire second lens group G2 is used as the image-shake correction lens group (image-stabilizing lens group), the entire zoom lens system can be further miniaturized.

EMBODIMENTS

Specific numerical embodiments will be herein discussed. In the aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The units for the various lengths defined herein are in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
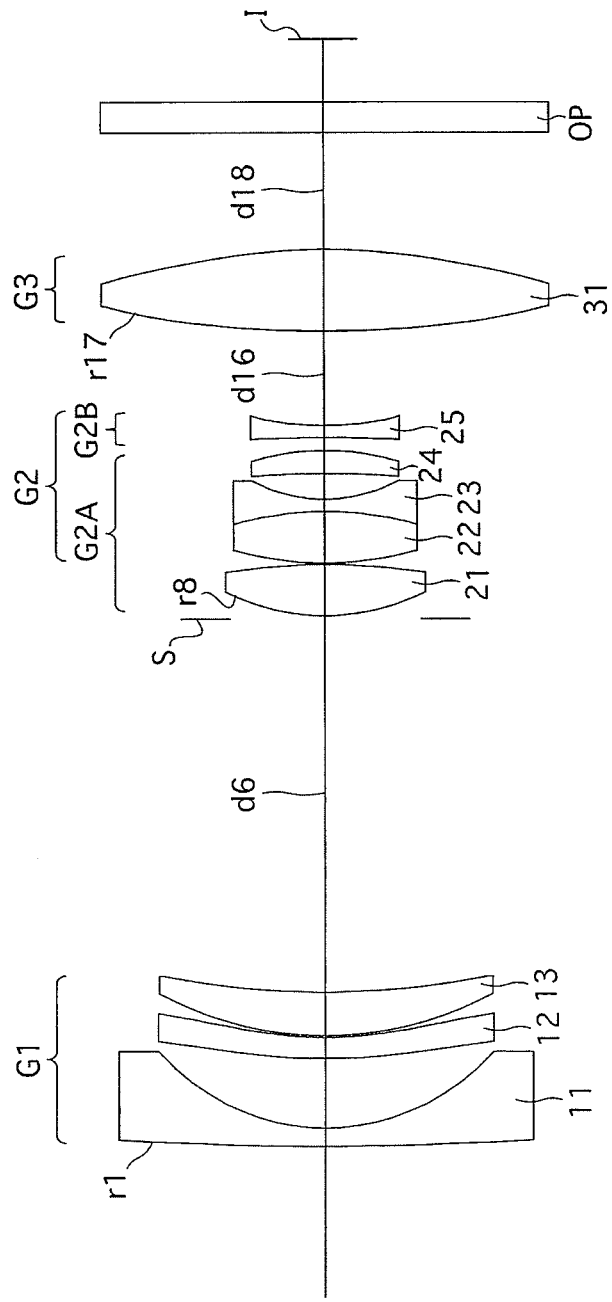
FIG. 1 shows a lens arrangement of a first numerical embodiment of a zoom lens system, according to the present invention, at the short focal length extremity when focused on an object at infinity.

FIGS. 1 through 4D and Tables 1 through 4 show a first numerical embodiment according to the present invention. FIG. 1 shows a lens arrangement of the first numerical embodiment when focusing on an object at infinity at the short focal length extremity. FIGS. 2A, 2B, 2C and 2D show various aberrations that occurred in the lens arrangement shown in FIG. 1 at the short focal length extremity when focused on an object at infinity. FIGS. 3A, 3B, 3C and 3D show various aberrations that occurred in the lens arrangement shown in FIG. 1 at an intermediate focal length when focused on an object at infinity. FIGS. 4A, 4B, 4C and 4D show various aberrations that occurred in the lens arrangement shown in FIG. 1 at the long focal length extremity when focused on an object at infinity. Table 1 shows the lens surface data, Table 2 shows various zoom lens system data, Table 3 shows the aspherical surface data, and Table 4 shows the lens group data of the zoom lens system according to the first numerical embodiment.

The zoom lens system of the first numerical embodiment is configured of a negative first lens group G1, a positive second lens group G2, and a positive third lens group G3, in that order from the object side. An optical filter OP is provided behind the third lens group G3 (and in front of the imaging plane I).

The first lens group G1 (surface Nos. 1 through 6) is configured of a negative meniscus lens element 11 having a convex surface on the object side, a negative meniscus lens element 12 having a convex surface on the object side, and a positive meniscus lens element 13 having a convex surface on the object side, in that order from the object side. The negative meniscus lens element 12 has an aspherical surface on each side thereof.

The second lens group G2 (surface Nos. 8 through 16) is configured of a positive first sub-lens group G2A (surface Nos. 8 through 14) and a negative second sub-lens group G2B (surface Nos. 15 and 16), in that order from the object side.

The first sub-lens group G2A is configured of a positive biconvex lens element 21, a cemented lens having a positive biconvex lens element 22 and a negative biconcave lens element 23, and a positive meniscus lens element 24 having a convex surface on the image side, in that order from the object side. The positive biconvex lens element 21 has an aspherical surface on each side thereof.

The second sub-lens group G2B is configured of a single negative biconcave lens element 25. The second sub-lens group (negative biconcave lens element 25) G2B constitutes a focusing lens group that is moved along the optical axis during focusing (upon focusing on an object at infinity to an object at a finite distance, the second sub-lens group (negative biconcave lens element 25) G2B is moved toward the image side to perform a focusing operation).

The diaphragm S (surface No. 7), which is disposed in between the first lens group G1 and the second lens group G2, moves integrally with the second lens group G2 during zooming.

The third lens group G3 (surface Nos. 17 and 18) is configured of a single positive biconvex lens element 31. The positive biconvex lens element 31 has an aspherical surface on each side.

The optical filter OP (surface Nos. 19 and 20) which is provided behind third lens group (the positive biconvex lens element 31) G3 (and in front of the imaging plane I) is a flat parallel plate which replaces, and is optically equivalent to, a filter group having a low-pass filter and an infrared cut filter, etc., and the cover glass of the image sensor (not shown).

TABLE 1

SURFACE DATA

| Surf. No. | r | d | Nd | vd |
|---|---|---|---|---|
| 1 | 225.037 | 1.200 | 1.80420 | 46.5 |
| 2 | 15.089 | 4.540 | | |
| 3* | 35.777 | 1.400 | 1.54358 | 55.7 |
| 4* | 25.707 | 0.100 | | |
| 5 | 23.830 | 2.897 | 1.84666 | 23.8 |
| 6 | 56.890 | d6 | | |
| 7(Diaphragm) | ∞ | 0.200 | | |
| 8* | 14.282 | 3.400 | 1.69350 | 53.2 |
| 9* | −36.678 | 0.100 | | |
| 10 | 23.448 | 3.400 | 1.61800 | 63.4 |
| 11 | −23.448 | 0.800 | 1.67270 | 32.2 |
| 12 | 10.398 | 1.732 | | |
| 13 | −65.570 | 1.516 | 1.72916 | 54.7 |
| 14 | −17.504 | 0.867 | | |
| 15 | −113.940 | 0.800 | 1.69680 | 55.5 |
| 16 | 20.598 | d16 | | |
| 17* | 104.882 | 5.377 | 1.54358 | 55.7 |
| 18* | −38.373 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 2

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.1 | 5.8 |
| f | 16.22 | 28.95 | 53.51 |
| W | 47.1 | 26.7 | 15.0 |
| Y | 14.20 | 14.20 | 14.20 |
| fB | 4.181 | 4.181 | 4.181 |
| L | 73.23 | 72.49 | 86.00 |
| d6 | 24.748 | 10.693 | 3.022 |
| d16 | 6.268 | 21.174 | 47.468 |
| d18 | 7.703 | 6.114 | 1.000 |

TABLE 3

Aspherical Surface Data (the aspherical surface coefficients not indicated are zero (0.00)):

| Surf. No. | K | A4 | A6 | A8 |
|---|---|---|---|---|
| 3 | 0.000 | −0.6506E−04 | 0.2633E−06 | −0.6673E−09 |
| 4 | 0.000 | −0.8622E−04 | 0.3361E−06 | −0.1316E−08 |
| 8 | −1.654 | 0.2252E−04 | 0.7673E−07 | |
| 9 | 0.000 | 0.5473E−04 | −0.5955E−07 | |
| 17 | 0.000 | 0.1953E−04 | −0.5202E−07 | 0.7721E−10 |
| 18 | 0.000 | 0.3153E−04 | −0.1037E−06 | 0.1448E−09 |

TABLE 4

LENS GROUP DATA

| Lens Group | 1st Surf. | Focal Length |
|---|---|---|
| 1 | 1 | −31.43 |
| 2 | 8 | 23.87 |
| (2A | 8 | 16.372) |
| (2B | 15 | −24.974) |
| 3 | 17 | 52.38 |

Numerical Embodiment 2

Figure 5:
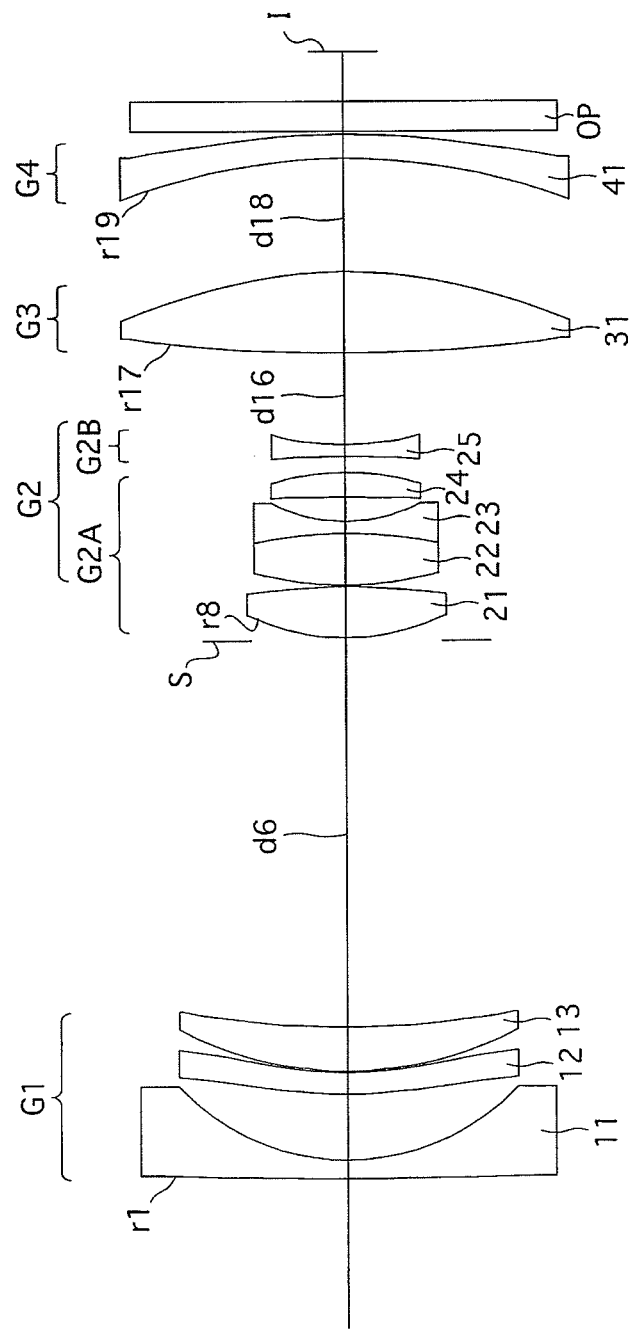
FIG. 5 shows a lens arrangement of a second numerical embodiment of a zoom lens system, according to the present invention, at the short focal length extremity when focused on an object at infinity.

FIGS. 5 through 8D and Tables 5 through 8 show a second numerical embodiment according to the present invention. FIG. 5 shows a lens arrangement of the second numerical embodiment when focusing on an object at infinity at the short focal length extremity. FIGS. 6A, 6B, 6C and 6D show various aberrations that occurred in the lens arrangement shown in FIG. 5 at the short focal length extremity when focused on an object at infinity. FIGS. 7A, 7B, 7C and 7D show various aberrations that occurred in the lens arrangement shown in FIG. 5 at an intermediate focal length when focused on an object at infinity. FIGS. 8A, 8B, 8C and 8D show various aberrations that occurred in the lens arrangement shown in FIG. 5 at the long focal length extremity when focused on an object at infinity. Table 5 shows the lens surface data, Table 6 shows various zoom lens system data, Table 7 shows the aspherical surface data, and Table 8 shows the lens group data of the zoom lens system according to the second numerical embodiment.

The lens arrangement of the second numerical embodiment is the same as that of the first numerical embodiment except that a fourth lens group G4 (surface Nos. 19 and 20), which is stationary with respect to the optical axis direction, is disposed in between the third lens group G3 and the imaging plane I (i.e., the distance between the fourth lens group and the imaging plane remains constant). The fourth lens group G4 is configured of a single negative meniscus lens element 41 having a convex surface on the image side. The negative meniscus lens element 41 has an aspherical surface on the image side thereof.

TABLE 5

SURFACE DATA

| Surf. No. | r | d | Nd | vd |
|---|---|---|---|---|
| 1 | 500.000 | 1.200 | 1.80420 | 46.5 |
| 2 | 15.720 | 4.371 | | |
| 3* | 32.168 | 1.400 | 1.54358 | 55.7 |
| 4* | 24.400 | 0.100 | | |
| 5 | 24.846 | 2.908 | 1.84666 | 23.8 |
| 6 | 62.170 | d6 | | |
| 7(Diaphragm) | ∞ | 0.200 | | |
| 8* | 14.679 | 3.400 | 1.69350 | 53.2 |
| 9* | −39.498 | 0.100 | | |
| 10 | 23.683 | 3.400 | 1.61800 | 63.4 |
| 11 | −30.733 | 0.800 | 1.68893 | 31.2 |
| 12 | 11.070 | 1.604 | | |
| 13 | −131.215 | 1.618 | 1.72916 | 54.7 |
| 14 | −17.776 | 1.065 | | |
| 15 | −87.264 | 0.800 | 1.69680 | 55.5 |
| 16 | 19.468 | d16 | | |
| 17* | 178.487 | 5.357 | 1.54358 | 55.7 |
| 18* | −30.729 | d18 | | |
| 19 | −42.495 | 1.600 | 1.54358 | 55.7 |
| 20* | −53.879 | 0.200 | | |

TABLE 5-continued

SURFACE DATA

| Surf. No. | r | d | Nd | vd |
|---|---|---|---|---|
| 21 | ∞ | 2.000 | 1.51680 | 64.2 |
| 22 | ∞ | — | | |

The asterisk (*) designates an aspherical surface which is rotationally symmetrical with respect to the optical axis.

TABLE 6

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.0 | 5.8 |
| f | 16.22 | 28.69 | 53.51 |
| W | 47.1 | 26.4 | 14.8 |
| Y | 14.20 | 14.20 | 14.20 |
| fB | 3.182 | 3.182 | 3.182 |
| L | 74.42 | 72.89 | 86.00 |
| d6 | 25.520 | 11.262 | 2.949 |
| d16 | 6.112 | 20.345 | 45.748 |
| d18 | 7.483 | 5.977 | 2.000 |

TABLE 7

Aspherical Surface Data (the aspherical surface coefficients not indicated are zero (0.00)):

| Surf. No. | K | A4 | A6 | A8 |
|---|---|---|---|---|
| 3 | 0.000 | −0.8077E−04 | 0.2678E−06 | −0.6677E−09 |
| 4 | 0.000 | −0.1013E−03 | 0.3274E−06 | −0.1139E−08 |
| 8 | −1.495 | 0.1843E−04 | 0.1034E−06 | |
| 9 | 0.000 | 0.5859E−04 | −0.4389E−07 | |
| 17 | 0.000 | 0.1899E−04 | −0.9932E−07 | 0.2394E−09 |
| 18 | 0.000 | 0.3258E−04 | −0.1799E−06 | 0.4226E−09 |
| 20 | 0.000 | 0.8034E−06 | 0.1338E−06 | −0.4239E−09 |

TABLE 8

LENS GROUP DATA

| Lens Group | 1st Surf. | Focal Length |
|---|---|---|
| 1 | 1 | −31.84 |
| 2 | 8 | 23.92 |
| (2A | 8 | 15.905) |
| (2B | 15 | −22.773) |
| 3 | 17 | 48.67 |
| 4 | 19 | −389.27 |

Numerical Embodiment 3

Figure 9:
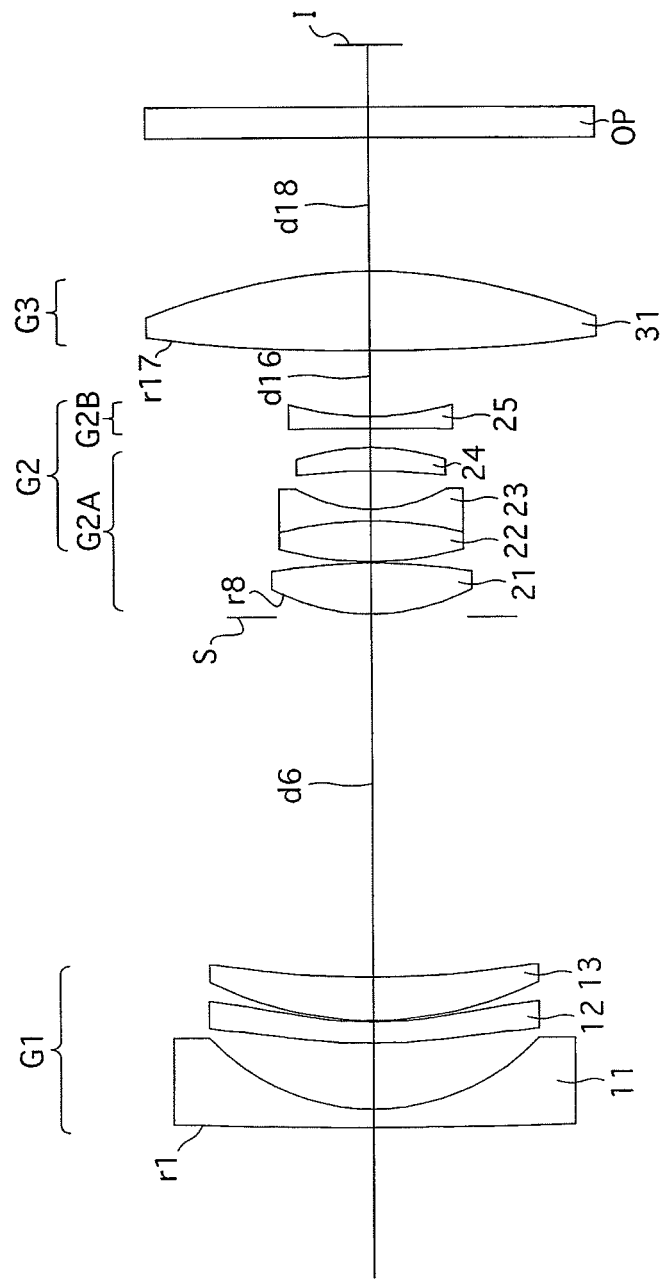
FIG. 9 shows a lens arrangement of a third numerical embodiment of a zoom lens system, according to the present invention, at the short focal length extremity when focused on an object at infinity.

FIGS. 9 through 12D and Tables 9 through 12 show a third numerical embodiment of a zoom lens system according to the present invention. FIG. 9 shows a lens arrangement of the third numerical embodiment when focusing on an object at infinity at the short focal length extremity. FIGS. 10A, 10B, 10C and 10D show various aberrations that occurred in the lens arrangement shown in FIG. 9 at the short focal length extremity when focused on an object at infinity. FIGS. 11A, 11B, 11C and 11D show various aberrations that occurred in the lens arrangement shown in FIG. 9 at an intermediate focal length when focused on an object at infinity. FIGS. 12A, 12B, 12C and 12D show various aberrations that occurred in the lens arrangement shown in FIG. 9 at the long focal length extremity when focused on an object at infinity. Table 9 shows the lens surface data, Table 10 shows various zoom lens system data, Table 11 shows the aspherical surface data, and Table 12 shows the lens group data of the zoom lens system according to the third numerical embodiment.

The lens arrangement of the third numerical embodiment is the same as that of the first numerical embodiment.

TABLE 9

SURFACE DATA

| Surf. No. | r | d | Nd | vd |
|---|---|---|---|---|
| 1 | 441.134 | 1.200 | 1.80420 | 46.5 |
| 2 | 15.334 | 4.334 | | |
| 3* | 36.506 | 1.400 | 1.54358 | 55.7 |
| 4* | 26.035 | 0.100 | | |
| 5 | 24.777 | 2.877 | 1.84666 | 23.8 |
| 6 | 66.693 | d6 | | |
| 7(Diaphragm) | ∞ | 0.200 | | |
| 8* | 13.665 | 3.378 | 1.69350 | 53.2 |
| 9* | −34.783 | 0.100 | | |
| 10 | 24.201 | 2.662 | 1.61800 | 63.4 |
| 11 | −26.411 | 0.800 | 1.67270 | 32.2 |
| 12 | 10.345 | 2.500 | | |
| 13 | −42.413 | 1.569 | 1.72916 | 54.7 |
| 14 | −16.112 | 1.266 | | |
| 15 | −331.190 | 0.800 | 1.69680 | 55.5 |
| 16 | 19.092 | d16 | | |
| 17* | 184.462 | 5.243 | 1.54358 | 55.7 |
| 18* | −33.706 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 10

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.2 | 5.8 |
| f | 16.22 | 30.00 | 53.51 |
| W | 46.7 | 25.7 | 15.2 |
| Y | 14.20 | 14.20 | 14.20 |
| fB | 4.182 | 4.182 | 4.182 |
| L | 71.60 | 72.26 | 85.00 |
| d6 | 23.826 | 9.882 | 2.812 |
| d16 | 4.338 | 21.630 | 46.579 |
| d18 | 8.823 | 6.135 | 1.000 |

TABLE 11

Aspherical Surface Data (the aspherical surface coefficients not indicated are zero (0.00)):

| Surf. No. | K | A4 | A6 | A8 |
|---|---|---|---|---|
| 3 | 0.000 | −0.8166E−04 | 0.4355E−06 | −0.1322E−08 |
| 4 | 0.000 | −0.1025E−03 | 0.4827E−06 | −0.1870E−08 |
| 8 | −2.446 | 0.7078E−04 | −0.1802E−06 | |
| 9 | 0.000 | 0.7306E−04 | −0.2240E−06 | |
| 17 | 0.000 | 0.5793E−05 | −0.9687E−09 | 0.1855E−10 |
| 18 | 0.000 | 0.1584E−04 | −0.4002E−07 | 0.7153E−10 |

TABLE 12

LENS GROUP DATA

| Lens Group | 1st Surf. | Focal Length |
|---|---|---|
| 1 | 1 | −31.39 |
| 2 | 8 | 23.80 |
| (2A | 8 | 16.789) |
| (2B | 15 | −25.882) |
| 3 | 17 | 52.87 |

Numerical Embodiment 4

Figure 13:
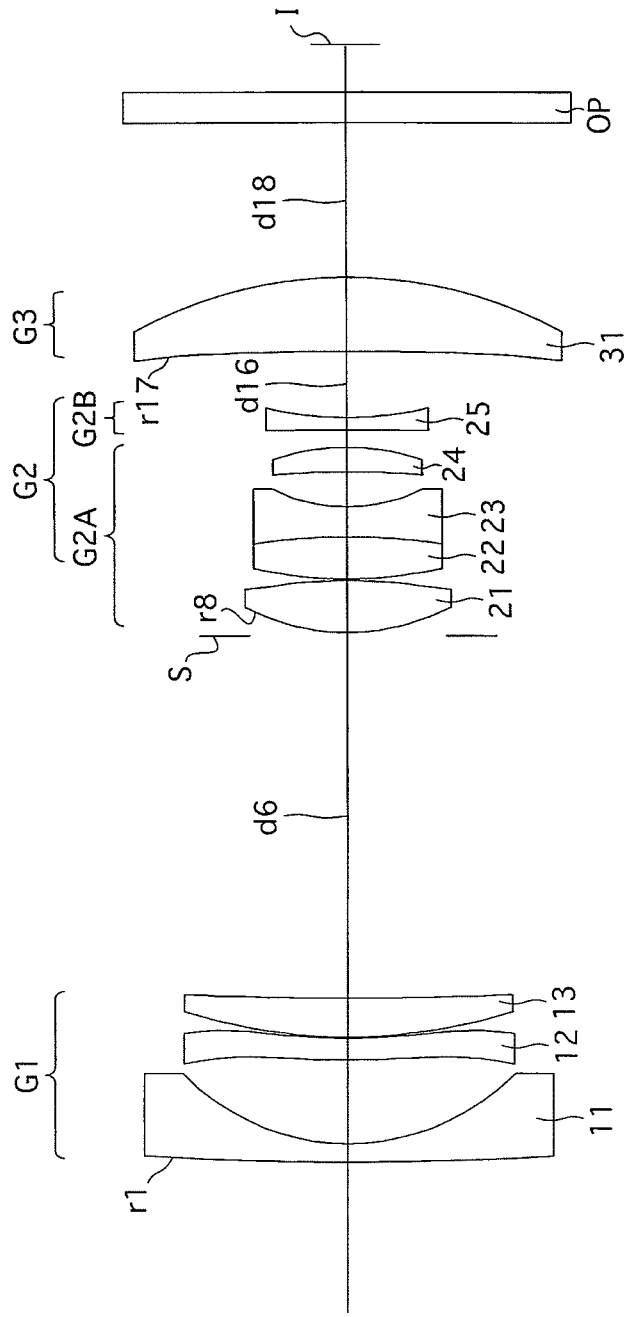
FIG. 13 shows a lens arrangement of a fourth numerical embodiment of a zoom lens system, according to the present invention, at the short focal length extremity when focused on an object at infinity.

FIGS. 13 through 16D and Tables 13 through 16 show a fourth numerical embodiment of a zoom lens system according to the present invention. FIG. 13 shows a lens arrangement of the fourth numerical embodiment when focusing on an object at infinity at the short focal length extremity. FIGS. 14A, 14B, 14C and 14D show various aberrations that occurred in the lens arrangement shown in FIG. 13 at the short focal length extremity when focused on an object at infinity. FIGS. 15A, 15B, 15C and 15D show various aberrations that occurred in the lens arrangement shown in FIG. 13 at an intermediate focal length when focused on an object at infinity. FIGS. 16A, 16B, 16C and 16D show various aberrations that occurred in the lens arrangement shown in FIG. 13 at the long focal length extremity when focused on an object at infinity. Table 13 shows the lens surface data, Table 14 shows various zoom lens system data, Table 15 shows the aspherical surface data, and Table 16 shows the lens group data of the zoom lens system according to the fourth numerical embodiment.

The lens arrangement of the fourth numerical embodiment is the same as that of the first numerical embodiment except that the positive lens element 31 of the third lens group G3 is a positive meniscus lens element having a convex surface on the image side.

TABLE 13

SURFACE DATA

| Surf. No. | r | d | Nd | vd |
|---|---|---|---|---|
| 1 | 232.866 | 1.200 | 1.80420 | 46.5 |
| 2 | 15.783 | 5.522 | | |
| 3* | 55.984 | 1.400 | 1.54358 | 55.7 |
| 4* | 31.854 | 0.109 | | |
| 5 | 37.066 | 2.557 | 1.84666 | 23.8 |
| 6 | 241.925 | d6 | | |
| 7(Diaphragm) | ∞ | 0.200 | | |
| 8* | 14.361 | 3.458 | 1.69350 | 53.2 |
| 9* | −31.575 | 0.100 | | |
| 10 | 28.472 | 2.793 | 1.48749 | 70.4 |
| 11 | −42.946 | 2.000 | 1.69895 | 30.0 |
| 12 | 11.207 | 2.353 | | |
| 13 | −55.437 | 1.614 | 1.69680 | 55.5 |
| 14 | −15.296 | 1.164 | | |
| 15 | −263.247 | 0.800 | 1.72916 | 54.7 |
| 16 | 23.246 | d16 | | |
| 17* | −283.576 | 4.922 | 1.54358 | 55.7 |
| 18* | −28.643 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 14

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.2 | 5.8 |
| f | 16.22 | 29.74 | 53.51 |
| W | 46.0 | 25.4 | 14.9 |
| Y | 14.20 | 14.20 | 14.20 |
| fB | 3.181 | 3.181 | 3.181 |
| L | 73.96 | 73.72 | 85.00 |
| d6 | 24.001 | 9.960 | 2.082 |
| d16 | 4.388 | 22.117 | 46.545 |
| d18 | 10.202 | 6.266 | 1.000 |

TABLE 15

Aspherical Surface Data (the aspherical surface coefficients not indicated are zero (0.00)):

| Surf. No. | K | A4 | A6 | A8 |
|---|---|---|---|---|
| 3 | 0.000 | −0.1252E−03 | 0.4141E−06 | −0.1069E−08 |
| 4 | 0.000 | −0.1457E−03 | 0.4617E−06 | −0.1260E−08 |
| 8 | −1.456 | 0.2128E−04 | 0.7923E−07 | |
| 9 | 0.000 | 0.6995E−04 | −0.1187E−06 | |
| 17 | 0.000 | 0.1646E−05 | −0.5232E−07 | 0.4156E−10 |
| 18 | 0.000 | 0.2021E−04 | −0.8821E−07 | 0.8400E−10 |

TABLE 16

LENS GROUP DATA

| Lens Group | 1st Surf. | Focal Length |
|---|---|---|
| 1 | 1 | −31.03 |
| 2 | 8 | 24.01 |
| (2A | 8 | 17.744) |
| (2B | 15 | −29.260) |
| 3 | 17 | 58.22 |

Numerical Embodiment 5

Figure 17:
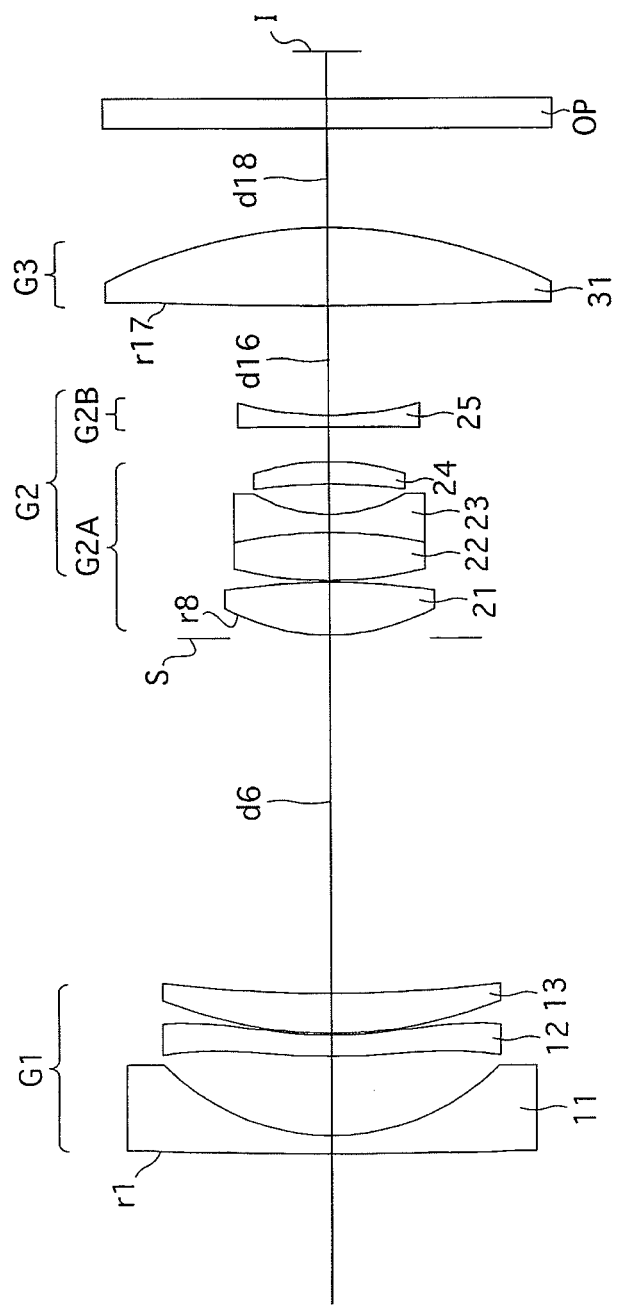
FIG. 17 shows a lens arrangement of a fifth numerical embodiment of a zoom lens system, according to the present invention, at the short focal length extremity when focused on an object at infinity.

FIGS. 17 through 20D and Tables 17 through 20 show a fifth numerical embodiment of a zoom lens system according to the present invention. FIG. 17 shows a lens arrangement of the fifth numerical embodiment when focusing on an object at infinity at the short focal length extremity. FIGS. 18A, 18B, 18C and 18D show various aberrations that occurred in the lens arrangement shown in FIG. 17 at the short focal length extremity when focused on an object at infinity. FIGS. 19A, 19B, 19C and 19D show various aberrations that occurred in the lens arrangement shown in FIG. 17 at an intermediate focal length when focused on an object at infinity. FIGS. 20A, 20B, 20C and 20D show various aberrations that occurred in the lens arrangement shown in FIG. 17 at the long focal length extremity when focused on an object at infinity. Table 17 shows the lens surface data, Table 18 shows various zoom lens system data, Table 19 shows the aspherical surface data, and Table 20 shows the lens group data of the zoom lens system according to the fifth numerical embodiment.

The lens arrangement of the fifth numerical embodiment is the same as that of the first numerical embodiment.

TABLE 17

SURFACE DATA

| Surf. No. | r | d | Nd | νd |
|---|---|---|---|---|
| 1 | 500.000 | 1.200 | 1.80420 | 46.5 |
| 2 | 15.945 | 5.228 | | |
| 3* | 42.360 | 1.400 | 1.54358 | 55.7 |
| 4* | 27.963 | 0.105 | | |
| 5 | 30.983 | 2.617 | 1.84666 | 23.8 |
| 6 | 98.717 | d6 | | |
| 7(Diaphragm) | ∞ | 0.200 | | |
| 8* | 13.791 | 3.542 | 1.69350 | 53.2 |
| 9* | −36.511 | 0.100 | | |
| 10 | 27.027 | 3.180 | 1.61800 | 63.4 |
| 11 | −29.985 | 1.200 | 1.67270 | 32.2 |
| 12 | 10.191 | 1.994 | | |
| 13 | −37.815 | 1.477 | 1.72916 | 54.7 |
| 14 | −16.106 | 2.299 | | |
| 15 | −503.778 | 0.800 | 1.77250 | 49.6 |
| 16 | 24.493 | d16 | | |
| 17* | 335.379 | 5.187 | 1.54358 | 55.7 |
| 18* | −28.721 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 18

ZOOM LENS SYSTEM DATA
Zoom Ratio 3.30

| | Short Focal Length Extremity | Intermediate Focal Length | Long Focal Length Extremity |
|---|---|---|---|
| FNO. | 2.9 | 4.1 | 5.7 |
| f | 16.22 | 29.34 | 53.51 |
| W | 47.1 | 25.9 | 15.0 |
| Y | 14.20 | 14.20 | 14.20 |
| fB | 3.182 | 3.182 | 3.182 |
| L | 72.89 | 72.25 | 85.00 |
| d6 | 23.448 | 9.930 | 2.514 |
| d16 | 7.235 | 21.860 | 45.775 |
| d18 | 6.500 | 4.746 | 1.000 |

TABLE 19

Aspherical Surface Data (the aspherical surface coefficients not indicated are zero (0.00)):

| Surf. No. | K | A4 | A6 | A8 |
|---|---|---|---|---|
| 3 | 0.000 | −0.1206E−03 | 0.3393E−06 | −0.7784E−09 |
| 4 | 0.000 | −0.1400E−03 | 0.4050E−06 | −0.1029E−08 |
| 8 | −1.042 | 0.2580E−05 | 0.1078E−06 | |
| 9 | 0.000 | 0.6311E−04 | −0.9766E−07 | |
| 17 | 0.000 | −0.2043E−05 | 0.3878E−07 | −0.1706E−09 |
| 18 | 0.000 | 0.1416E−04 | 0.1754E−07 | −0.1572E−09 |

TABLE 20

LENS GROUP DATA

| Lens Group | 1st Surf. | Focal Length |
|---|---|---|
| 1 | 1 | −29.65 |
| 2 | 8 | 22.80 |
| (2A | 8 | 17.657) |
| (2B | 15 | −30.216) |
| 3 | 17 | 48.91 |

The numerical values of each condition for each embodiment are shown in Table 21.

TABLE 21

| | Embod. 1 | Embod. 2 | Embod. 3 |
|---|---|---|---|
| Cond. (1) | −0.956 | −1.051 | −0.920 |
| Cond. (2) | 0.694 | 1.313 | 0.891 |
| Cond. (3) | 55.46 | 55.46 | 55.46 |
| Cond. (4) | 0.063 | 0.063 | 0.061 |
| Cond. (5) | 1.175 | 1.155 | 1.206 |

| | Embod. 4 | Embod. 5 |
|---|---|---|
| Cond. (1) | −0.821 | −0.755 |
| Cond. (2) | 0.838 | 0.907 |
| Cond. (3) | 54.67 | 49.6 |
| Cond. (4) | 0.056 | 0.055 |
| Cond. (5) | 1.210 | 1.145 |

As can be understood from Table 21, the first through fifth embodiments satisfy conditions (1) through (5). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, and a positive third lens group, in that order from the object side, wherein upon zooming from the short focal length extremity to the long focal length extremity, the distance between said first lens group and said second lens group decreases, and the distance between said second lens group and said third lens group increases, wherein said second lens group includes a positive first sub-lens group and a negative second sub-lens group, in that order from the object side, wherein said second sub-lens group comprises a focusing lens group which is moved along the optical axis direction during a focusing operation, and wherein the following condition (1) is satisfied:

$$-1.5 < F2/F2B < -0.7 \quad (1),$$

wherein F2 designates the focal length of said second lens group, and

F2B designates the focal length of said second sub-lens group;

wherein said second sub-lens group consists of a single lens element; and wherein focusing on an object at infinity to an object at a finite distance is performed by moving said second sub-lens group toward the image side.

2. The zoom lens system according to claim 1, wherein the following condition (2) is satisfied:

$$0 < (RA+RB)/(RA-RB) < 3 \quad (2),$$

wherein RA designates the radius of curvature of the surface on the object side of said single negative lens element of said second sub-lens group, and RB designates the radius of curvature of the surface on the image side of said single negative lens element of said second sub-lens group.

3. The zoom lens system according to claim 1, wherein the following condition (3) is satisfied:

$$\nu 2B > 45 \quad (3),$$

wherein

ν2B designates the Abbe number with respect to the d-line of said single negative lens element of said second sub-lens group.

4. The zoom lens system according to claim 1, wherein the following condition (4) is satisfied:

$$T2B/T2<0.1 \quad (4),$$

wherein

T2B designates the distance along the optical axis from the surface of said second sub-lens group that is closest to the object side to the surface of said second sub-lens group that is closest to the image side, and T2 designates the distance along the optical axis from the surface of said second lens group that is closest to the object side to the surface of said second lens group that is closest to the image side.

5. The zoom lens system according to claim 1, wherein the following condition (5) is satisfied:

$$1.05<M3T/M3W<1.35 \quad (5),$$

wherein

M3T designates the lateral magnification of said third lens group when focusing on an object at infinity at the long focal length extremity, and M3W designates the lateral magnification of said third lens group when focusing on an object at infinity at the short focal length extremity.

6. The zoom lens system according to claim 1, wherein said first sub-lens group of said second lens group comprises a positive lens element, a positive lens element, a negative lens element, and a positive lens element, in that order from the object side.

7. The zoom lens system according to claim 1, wherein a fourth lens group is provided in between said third lens group and the imaging plane, wherein said fourth lens group comprises a single negative lens element and remains stationary with respect to the optical axis direction.

8. The zoom lens system according to claim 1, wherein said second sub-lens group of said second lens group comprises an image-stabilizing lens group which is moved in a direction orthogonal to the optical axis to change the imaging position in order to correct image shake.

9. The zoom lens system according to claim 1, wherein said first lens group comprises a negative lens element, a lens element having an aspherical surface on at least one side thereof, and a positive lens element, in that order from the object side.

* * * * *